United States Patent [19]

Karim et al.

[11] 4,373,066

[45] Feb. 8, 1983

[54] POLYMER COMPOSITIONS

[75] Inventors: Khalid A. Karim; Pallavoor R. Lakshmanan; James H. Rea, all of Houston, Tex.

[73] Assignee: Gulf Oil Corporation, Pittsburgh, Pa.

[21] Appl. No.: 224,707

[22] Filed: Jan. 12, 1981

[51] Int. Cl.³ .............................. C09J 3/00; C09J 3/14; C08L 23/08
[52] U.S. Cl. .................................... 525/133; 525/196; 525/221; 156/334; 156/327; 156/244.11; 428/516
[58] Field of Search ................... 156/334, 327, 244.11; 525/202, 220, 221, 196, 201, 227, 133; 260/DIG. 31, 27 EV, 27 R; 428/516, 517

[56] References Cited

U.S. PATENT DOCUMENTS

| | | | |
|---|---|---|---|
| 3,298,855 | 1/1967 | Helin et al. | 428/516 |
| 3,365,520 | 1/1968 | Foster | 525/221 |
| 3,454,676 | 7/1969 | Busse | 525/221 |
| 3,970,626 | 7/1976 | Hurst et al. | 525/366 |
| 4,146,521 | 3/1979 | Godfrey | 156/334 |
| 4,235,980 | 11/1980 | Bateman | 525/221 |

Primary Examiner—Edward C. Kimlin
Assistant Examiner—L. Falasco
Attorney, Agent, or Firm—Richard L. Kelly

[57] ABSTRACT

Compatible blends of polymers are disclosed which contain (a) a low density ethylene polymer, (b) a copolymer of ethylene and an alkyl ester of acrylic or methacrylic acid or vinyl acetate, (c) an ionomer resin, and (d) a tackifying resin such as an aromatic hydrocarbon resin.

7 Claims, No Drawings

POLYMER COMPOSITIONS

BACKGROUND OF THE INVENTION (a) Field of the Invention

The invention relates to blends of thermoplastic resins. Each blend will contain a minimum of four components.

(b) Description of the Prior Art

While the prior art describes blends of thermoplastic resins containing two or more of the components employed in the compositions of the present invention, the prior art does not disclose the multicomponent compositions described and claimed herein.

SUMMARY OF THE INVENTION

The applicants have discovered novel blends of polymers consisting essentially of:
 (a) A low density ethylene polymer,
 (b) An ethylene copolymer,
 (c) An ionomer resin, and
 (d) A tackifying resin.

The compositions have utility principally as hot melt adhesives and as laminating resins used in the manufacture of composite film constructions by coextrusion processes.

DETAILED DESCRIPTION OF THE INVENTION

The low density ethylene polymers included in the blends will be the conventional film forming grades of ethylene polymers which have a density of less than about 0.945, preferably less than about 0.94, and more especially less than about 0.93. It is preferred to employ polymers having melt indexes* in a range of about 0.5–20, preferably about 0.5–10, and more especially about 0.5–5.0. The low density ethylene polymers can be prepared by the well known high pressure processes, or by lower pressure processes by copolymerizing ethylene with $C_3$ and higher alpha-olefins.

The ethylene copolymers included in the blends have polymerized therein about 70 to 90, preferably about 78–83, and more especially about 80 weight % of ethylene, with the balance of the copolymer being an alkyl ester of acrylic or methacrylic acid or vinyl acetate. The alkyl group of the acrylic or methacrylic acid ester may contain from about 1 to 18 carbon atoms, with the preferred esters being the methyl and the ethyl esters. The preferred ethylene copolymers will have melt indexes* in the range of about 1–100, preferably about 2–40, and more especially about 15–25.** Such copolymers can be prepared by known methods as disclosed, for example, in U.S. Pat. No. 3,350,372. It is preferred practice to control both the alkyl acrylate or vinyl acetate content of the copolymer and the ratios of the two ethylene polymers, so that the alkyl acrylate or vinyl acetate moiety constitutes about 4–12 and preferably about 6–10 weight % of the total weight of the two ethylene polymers.

*As determined by ASTM 1238-70, Condition E.
**The vinyl acetate copolymers normally will have higher melt index values than the acrylate ester copolymers.

The ionomer resin included in the blends will be a metal salt of an ethylene-acid copolymer, specifically a copolymer of ethylene and acrylic or methacrylic acid having an acid content of about 1–10 mol %. The ethylene-acid copolymer, in addition to the polymerized ethylene and acid moiety, may contain up to about 10 mol % of additional polymerized monomer moieties such as vinyl acetate, alkyl acrylates, alkyl methacrylates, acrylamide, methacrylamide, and the like. The cation employed in the salt preferably is monovalent such as alkali metal ions, e.g., sodium and potassium ions. Certain polyvalent metal ions can be employed in certain circumstances, e.g., zinc ions. In most cases, it is preferred to employ the metal cation in an amount that is less than stoichiometrically equivalent to the carboxylic acid groups of the ethylene-acid copolymer. Where the preferred quantity of the metal cation is employed, the ionomers can be viewed as being terpolymers containing polymerized ethylene, a salt of the polymerized acid, and the free polymerized acid.

The composition of the ionomer, including its molecular weight, mol % acid content, and cation content, should be adjusted so that the ionomer has a high load melt index (ASTM 1238-70, Condition F) of at least about 1.0. It's feasible to employ ionomers having a normal load melt index (ASTM 1238-70, Condition E) as high as about 50. The preferred ionomer resins will have a normal load melt index in a range of about 1 to 5. Suitable ionomers can be prepared by methods reported in the prior art. See. U.S. Pat. No. 3,264,272; U.S. Pat. No. 3,485,785; and U.S. Pat. No. 3,970,626. One method consists of preparing an ethylene-acrylic (or methacrylic) acid copolymer and reacting it with sodium hydroxide to convert the desired percentage of carboxylic acid groups to sodium carboxylate groups. Another method involves saponifying an ethylene-alkyl acrylate (or methacrylate) copolymer with an aqueous sodium hydroxide solution to form a stable aqueous emulsion of the sodium salt of an ethylene-acrylic (or methacrylic) acid copolymer. Such emulsion can be coagulated with carbon dioxide as disclosed in U.S. Pat. No. 3,553,178 to recover the sodium salt in a solid form.

The tackifying resin included in the compositions will be selected from the group consisting of:
 (i) Aromatic hydrocarbon resins having a Ring and Ball softening temperature of about 40°–160° C.,* and
 (ii) Terpene-phenolic resins having a Ring and Ball softening point of about 80°–135° C.*

*All Ring and Ball softening points are determined by ASTM E-28-58T.

The tackifying resins employed in the invention are known products available from commercial sources. The suitable aromatic hydrocarbon resins are derived from petroleum or coal tar distillates. Particularly suitable are those selected from the group consisting of resins based on coumarone or indene, such as coumarone-indene resins, styrene-indene-isoprene terpolymers, etc. In general, the Ring and Ball softening point of these resins will be between about 40° C. to about 160° C. Resins of this type are sold under the trade designation Piccovar. The Piccovar L resins are particularly suitable for use in the invention. The terpene-phenolic resins are known materials described at pages 183 and 184 of the text *Organic Coating Technology*, Vol. I, by Henry Fleming Payne, John Wiley & Sons, Inc., 1954, Library of Congress Catalog Card Number 54-5971. Resins of this type are sold under the trade designation Piccofyn. The Piccofyn A resins are particularly suitable for use in the invention.

The proportions of the components to be included in the compositions will vary somewhat depending upon the intended end use application of the composition. As earlier noted, the low density ethylene polymer and the ethylene copolymer preferably will be employed in a ratio such that the alkyl acrylate (or methacrylate) moiety will constitute about 4–12 and more especially about 6–10 weight % of the total weight of the two ethylene polymers. The sum of the ionomer resin and the tackifying resin* concentrations customarily employed will fall within a range of about 15–200, preferably about 20–100, and more especially about 30–75 parts per 100 parts of the two ethylene polymers. It is preferred to employ the tackifying resin in a proportion somewhat higher than the ionomer resin. It is generally preferred not to employ the tackifying in excess of 150 parts per 100 parts of the two ethylene polymers, and more especially not in excess of 100 parts per 100 parts of the two ethylene polymers.

*When two or more tackifying resins are included in a composition, the total concentration of the tackifying resins will be considered to be a single component for purposes of calculating composition percentages and ratios.

The above ranges are applicable for most end use applications presently visualized, particularly where good adhesive properties are desired. It will be recognized that optimum properties for other end use applications may vary somewhat, particularly if the ratio of the two ethylene polymers and/or the composition of the ionomer resin differs from the compositions subsequently exemplified. In addition, it will be recognized that several variables are present in the disclosed 4 component compositions; these being, inter alia, the melt index of the two ethylene polymers, and the chemical variants in the ionomer resin and the tackifying resin. For this reason, optimum properties for any combination of components will be found at different composition ranges within the ranges discussed supra. Optimum compositions for any such system can be established with a minimum of experimental work for the system of interest.

In addition to the components discussed above, the compositions of the invention may contain additional components which do not alter their functional utility for intended end use applications. For most applications, it is desirable to include an antioxidant in the compositions. Antioxidants customarily employed with ethylene polymers are suitable. Where the compositions are to be used as a hot melt adhesive, certain wax-like materials may be included to lower the compositions' melting point and/or melt viscosity. Where used, such diluents may be used in amounts of up to about 30 parts per 100 parts of the total adhesive formulation. Suitable wax diluents include: (1) low molecular weight, liquid polybutenes in the range of from about 600 to 3000; (2) petroleum waxes such as a paraffin wax having a melting point of about 130°–165° F., and a microcrystalline wax having a melting point of about 140°–200° F.; the latter melting points being determined by ASTM method D 127-60; (3) polyethylene greases having a softening point of about 80°–100° C., and a hardness value, as determined by ASTM method D-1321, of about 60–120; (4) mineral oil; and (5) synthetic waxes made by polymerizing carbon monoxide and hydrogen, such as Fischer-Tropsch wax.

A desirable characteristic of the compositions of the invention is that they are quite transparent and have good adhesion to a number of important materials, including wood, paper, aluminum foil, copper foil, ethylene homopolymers of both the low density and high density types, isotactic propylene polymers, ethylene-vinyl alcohol copolymers (obtained by hydrolysis of ethylene vinyl acetate copolymers) and polyethylene terephthalate polyesters. Accordingly, the compositions are well suited for use in the manufacture of laminated sheet constructions by conventional laminating techniques.

They also are well suited for use in the manufacture of composite thermoplastic film constructions by coextrusion techniques of the type shown in U.S. Pat. No. 4,152,387. They also can be employed as hot melt adhesives to form strong bonds between surfaces of the type noted supra.

In addition to their favorable physical properties, the compositions of the invention have a favorable combination of electrical properties measured by dissipation factor, dielectric constant and dielectric strength. Accordingly, they can be used as an adhesive to bond polyethylene terephthalate film to copper foil to prepare articles useful in the electronics industry.

The following examples are set forth to illustrate more clearly the principle and practice of the invention to those skilled in the art. Where parts or percentages are mentioned, they are parts or percentages on a weight basis unless otherwise noted. The polymeric materials employed in the examples are described below.

The ethylene homopolymer employed was a commercially available low density film grade ethylene homopolymer having a density of about 0.924 and a melt index of about 0.8.

Ethylene copolymer A was a commercially available ethylene-methyl acrylate copolymer which contained 20 weight % of methyl acrylate and had a melt index of about 2.4.

Ethylene copolymer B was an ethylene-ethyl acrylate copolymer containing about 18 weight % ethyl acrylate and having a melt index of about 6.

Ionomer resin A was a commercial product sold under the designation Surlyn 1601. This product is reported by the manufacturer to be a sodium salt of an ethylene-methacrylic acid copolymer having a melt index of about 1.3.

Ionomer resin B was a commercial product sold under the designation Surlyn 1605. This product is reported by the manufacturer to be a sodium salt of an ethylene-methacrylic acid copolymer having a melt index of about 2.8.

Ionomer resin C was a commercial product sold under the designation Surlyn 1652. This product is reported by the manufacturer to be a zinc salt of an ethylene-methacrylic acid copolymer having a melt index of about 5.0.

Tackifying resin A was a commercial product sold under the designation Piccovar L-60. This product is reported by the manufacturer to be an aromatic resin having a melting point of about 60° C.

Tackifying resin B was a commercial product sold under the designation Piccofyn A-115. This product is reported by the manufacturer to be a terpene-phenolic resin having a softening point of about 115° C.

EXAMPLE 1

A blend was prepared from 70 parts of the ethylene homopolymer, 30 parts of Ethylene Copolymer A, 15 parts of Ionomer Resin A, and 40 parts of Tackifying Resin A. The blend was prepared by fluxing the materials for 20 minutes in a Brabender Plasticorder operated at approximately 130° C. and 40 rpm. The blend subsequently was ground to a particle size that passed through an 8-mesh screen.

The adhesion of the blend to polyethylene terephthalate film* was measured. The powdered blend was distributed over a section of one sheet of the polyester film (5 mil thick) and a second sheet of polyester film was laid on the assembly. The assembly then was pressed for 10 minutes at 300° F. under an applied pressure of 2500 lbs/in$^2$. Specimens 1" wide were cut through both the bonded and the unbonded (adhesive free area) sections of the laminate. The peel strength of the laminated section was measured by pulling the laminate apart in an Instron machine operated at a cross head speed of 2"/minute. The peel strength was 3.2 lbs/inch.

*Sold under the designation Mylar.

Comparable results are obtained when Ethylene Copolymer B is employed in lieu of Ethylene Copolymer A or when Ionomer Resin B or C is substituted for Ionomer Resin A.

EXAMPLE 2

Example 1 was repeated except that Tackifying Resin B was substituted for Tackifying Resin A. The blend had a peel strength of 1.7 lbs/inch in bonding together sheets of polyethylene terephthalate film as tested by the procedure described in Example 1.

In the above discussions, reference was made to several publications and patents for descriptions of certain components employed in the compositions of the invention, test methods employed and the like. The descriptions of the publications and patents are incorporated herein by reference.

What is claimed:

1. A compatible blend of polymers consisting essentially of:
   (a) A low density ethylene polymer,
   (b) An ethylene copolymer,
   (c) An ionomer resin, and
   (d) A tackifying resin;
said low density ethylene polymer having a density of less than about 0.945 and a normal load melt index of about 0.5–20; said ethylene copolymer having polymerized therein about 70 to 90 weight % of ethylene and the balance an alkyl ester of acrylic or methacrylic acid or vinyl acetate; said two ethylene polymers being present in proportions such that the alkyl ester or vinyl acetate moiety of the ethylene copolymer constitutes about 4–12 weight % of the total weight of the two ethylene polymers; said ionomer resin being a metal salt of an ethylene-acid copolymer which is a copolymer of ethylene and acrylic or methacrylic acid having an acid content of about 1–10 mol % and having a high load melt index of at least about 1.0 and a normal load melt index of up to about 50; said tackifying resin being selected from the group consisting of:
   (1) Aromatic hydrocarbon resins having a Ring and Ball softening temperature of about 40°–160° C.,
   (ii) Terpene-phenolic resins having a Ring and Ball softening point of about 80°–135° C.
said composition containing 100 parts by weight of the two ethylene polymers and about 15–200 parts by weight of the ionomer resin and tackifying resin.

2. A composition of claim 1 in which the tackifying resin is present in an amount in excess of the ionomer resin.

3. A composition of claim 2 in which the tackifying resin is present in an amount not in excess of about 100 parts per weight per 100 parts of the two ethylene polymers.

4. A composition of claim 1, 2, or 3 in which the ethylene copolymer is a copolymer of ethylene and methyl acrylate.

5. A composition of claim 1, 2, or 3 in which the ethylene copolymer is a copolymer of ethylene and ethyl acrylate.

6. A composition of claim 1, 2, or 3 in which the ethylene copolymer is a copolymer of ethylene and vinyl acetate.

7. A composition of claim 1, 2, or 3 in which the ionomer resin is a partial alkali metal salt of the ethylene-acid copolymer.

* * * * *